E. C. HEGELER & F. W. MATTHIESSEN.
RELIEF APPARATUS FOR ROLLING-MILLS.

No. 192,163. Patented June 19, 1877.

UNITED STATES PATENT OFFICE.

EDWARD C. HEGELER AND FREDERICK W. MATTHIESSEN, OF LA SALLE, ILLINOIS.

IMPROVEMENT IN RELIEF APPARATUS FOR ROLLING-MILLS.

Specification forming part of Letters Patent No. 192,163, dated June 19, 1877; application filed May 5, 1877.

*To all whom it may concern:*

Figure 1:
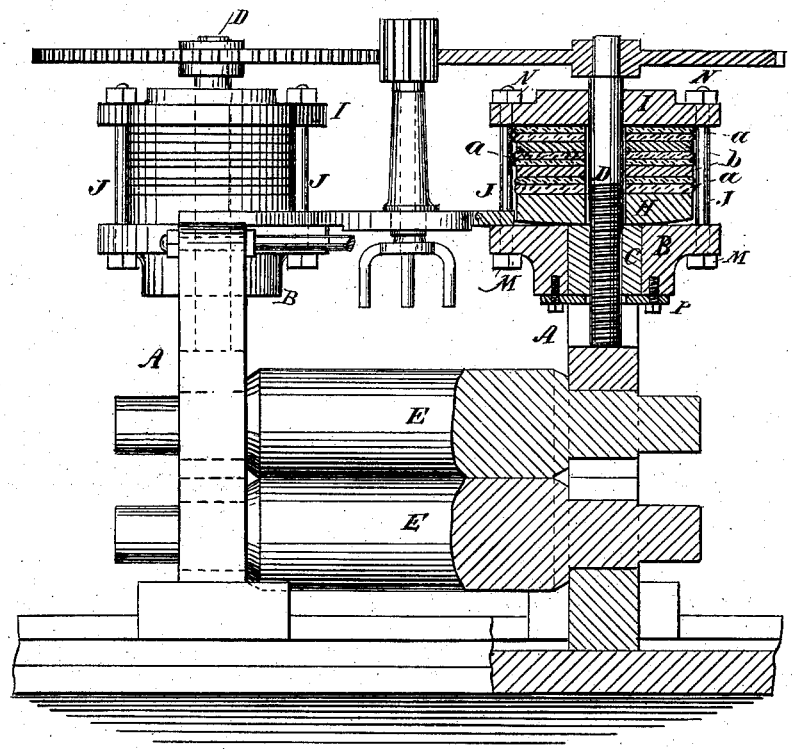
Figure 2:
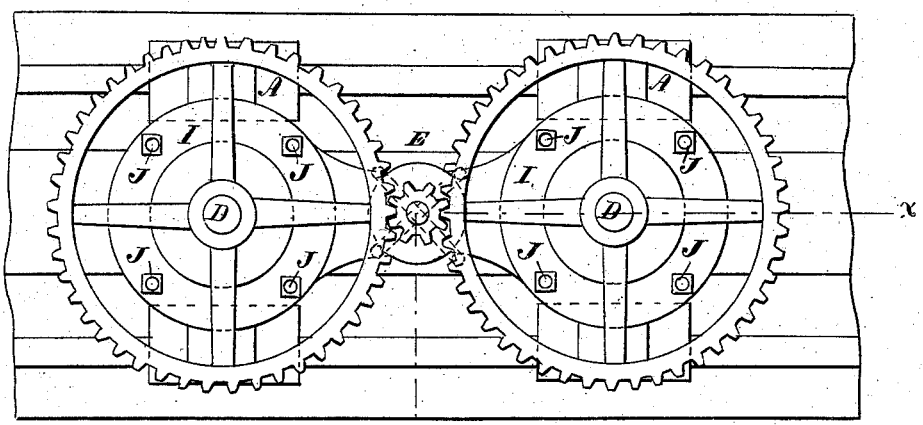

Be it known that we, EDWARD C. HEGELER and FREDERICK W. MATTHIESSEN, of La Salle, in the county of La Salle and State of Illinois, have invented a new and useful Improvement in Relief Apparatus for Rolling-Mills, of which the following is a specification:

Figure 1 is a side elevation in part section on line $x\,x$, in Fig. 2, of our improved mill. Fig. 2 is a plan view.

Similar letters of reference indicate corresponding parts.

The object of this invention is to prevent the breakage of rolls and roll-gear by connecting the screws that regulate the distance between the rolls with rubber cushions, which permit the rolls to separate under extraordinary pressure, but do not yield under the usual working pressure.

Referring to the drawing, A are the standards of the housings of the rolls, and B are the top pieces of the housings, which are cylindrically bored out to receive nuts C, through which the screws D pass that regulate the pressure between the rolls E E. The nut C can move freely up and down in its chamber in the top part B, but is prevented from turning around by a key. Upon the top piece B rests the plate H, which has a hole in its center large enough to clear the screw D, but smaller than the outside diameter of the nut C, so that if the nut C is pressed upward it has to lift the plate H. Upon the plate H rubber disks $a$ and metallic plates $b$ are placed in alternation, and on the top the heavy plate I, all perforated for the passage of the screw $d$. Heavy bolts J pass through holes in this top plate I, and through holes in the top piece B of the housing. By means of these bolts, with their heads M and screw-nuts N, the plate I, and with it the plate H and the intermediate rubber disks $a$, are held and drawn with great force against the top part B of the housing. The rubber disks $a$ are thus compressed to such a degree that it takes an excessive strain of the rolls E against the screw D, and consequently on the nut C and plate H, to compress them farther. The nut C is held up against the plate H by a plate, P, which is screwed with bolts from below to the top piece B.

In the rolling of the metal, when the set-screws D are drawn too tightly, or the strain on the rolls from the metal passing between them becomes too great from some other cause, in mills as ordinarily constructed some part of the machinery is strained or broken; but with our improvement the yielding of the rubber disks $a$ to the pressure on the screw-nut C generally permits the obstruction to pass without injury to the machinery.

This machinery is specially adapted to the rolling of sheet-zinc; but it may be applied to rolls for other rolling-mills.

Having thus described our invention, we claim as new and desire to secure by Letters Patent—

The combination, in a rolling-mill, of the plate B, nut C, screw D, disk H, spring composed of rubber disks $a$ and metallic disks $b$, plate I, and bolts J, substantially as shown and described.

EDWARD C. HEGELER.
F. W. MATTHIESSEN.

Witnesses:
CH. GRAF,
G. WEERTS.